United States Patent
Morinaga

[11] Patent Number: 6,134,884
[45] Date of Patent: Oct. 24, 2000

[54] AIR-FUEL RATIO CONTROL APPARATUS FOR INTERNAL COMBUSTION ENGINE

[75] Inventor: Noriyoshi Morinaga, Susono, Japan

[73] Assignee: Toyota Jidosha Kabushiki Kaisha, Toyota, Japan

[21] Appl. No.: 09/260,116

[22] Filed: Mar. 2, 1999

[30] Foreign Application Priority Data

Apr. 1, 1998 [JP] Japan .................................. 10-088811

[51] Int. Cl.$^7$ ............................... F01N 3/20; F01N 9/00; F02D 13/02; F02D 41/06
[52] U.S. Cl. ............................................... 60/285; 60/284
[58] Field of Search ............................ 60/284, 285, 286

[56] References Cited

U.S. PATENT DOCUMENTS

| | | | |
|---|---|---|---|
| 4,007,590 | 2/1977 | Nagai et al. | 60/284 |
| 4,729,220 | 3/1988 | Terasaka et al. | 60/285 |
| 5,207,058 | 5/1993 | Sasaki et al. | 60/284 |
| 5,211,011 | 5/1993 | Nishikawa et al. | 60/284 |
| 5,564,404 | 10/1996 | Takahashi et al. | 60/285 |
| 5,655,365 | 8/1997 | Worth et al. | 60/285 |
| 5,722,371 | 3/1998 | Denz et al. | 123/406.42 |
| 5,967,113 | 10/1999 | Kaneko et al. | 123/295 |
| 5,974,785 | 11/1999 | Cunningham et al. | 60/284 |
| 6,041,591 | 3/2000 | Kaneko et al. | 60/285 |

FOREIGN PATENT DOCUMENTS

| | | |
|---|---|---|
| 62-178740 | 8/1987 | Japan . |
| 5-33705 | 2/1993 | Japan . |
| 7-83148 | 3/1995 | Japan . |
| 7-166976 | 6/1995 | Japan . |
| 9-88680 | 3/1997 | Japan . |
| 9-96216 | 4/1997 | Japan . |
| 9-250379 | 9/1997 | Japan . |

*Primary Examiner*—Joseph Pelham
*Attorney, Agent, or Firm*—Kenyon & Kenyon

[57] ABSTRACT

An air-fuel ratio control apparatus for an internal combustion engine has a fuel injection valve for supplying fuel to the engine, a catalytic converter disposed in an exhaust passage of the engine, and an $O_2$-sensor for detecting the air-fuel ratio. Before the temperature of the catalytic converter increases to a temperature at which the catalyst is activated, a quantity of unburned fuel present in the exhaust gas is increased by increasing a fuel injection duration within an open intake valve period to a duration Longer than a fuel injection duration within the open intake valve period after activation of the catalytic device.

19 Claims, 6 Drawing Sheets

AIR-FUEL RATIO CONTROL APPARATUS FOR INTERNAL COMBUSTION ENGINE

INCORPORATION BY REFERENCE

The disclosure of Japanese Patent Application No. HEI 10-88811 filed on Apr. 1, 1998 including the specification, drawings and abstract is incorporated herein by reference in its entirety.

BACKGROUND OF THE INVENTION

1. Field of the invention

The present invention relates to an air-fuel ratio control apparatus for an internal combustion engine.

2. Description of the Related Art

Air-fuel ratio control apparatus for an internal combustion engine are known which increase the temperature of a three-way catalytic device disposed in an exhaust passage of the engine to an activation temperature. That is, in an early period after the engine is started, such systems warm up a three-way catalytic device by supplying residual unburned fuel and oxygen to the three-way device to cause them to react around the three-way device. An example of this type of air-fuel ratio control apparatus for an internal combustion engine is disclosed in Japanese Patent Application Laid-open No. SHO 62-178740. An air-fuel ratio control apparatus for a multi-cylinder internal combustion engine described in this laid-open patent application warms up a three-way catalytic device by performing fuel-rich operation in one cylinder to supply unburned fuel to the three-way catalytic device while performing fuel-lean operation in another cylinder to supply unburned oxygen to the three-way catalytic device.

However, air-fuel ratio control in the apparatus described in Japanese Patent Application Laid-open No. SHO 62-178740 is complicated, since it is necessary to perform fuel-rich operation in one cylinder while performing fuel-lean operation in another cylinder, that is, performing air-fuel ratio control separately for the individual cylinders, during the warm-up of the three-way catalytic device.

An air-fuel ratio control apparatus for an internal combustion engine capable of warming up a three-way catalytic device by supplying unburned fuel and oxygen to the three-way catalytic device without a need to perform different air-fuel ratio controls for the individual cylinders is described in, for example, Japanese Patent Application Laid-open No. HEI 5-33705. The internal combustion engine air-fuel ratio control apparatus described in this laid-open patent application warms up a three-way catalytic device by forcibly switching between fuel-rich operation for supplying unburned fuel to the three-way catalytic device and fuel-lean operation for supplying unburned oxygen to the three-way catalytic device at predetermined time periods.

However, in the internal combustion engine air-fuel ratio control apparatus described in Japanese Patent Application Laid-open No. HEI 5-33705, the air-fuel ratio control is still complicated, since it is necessary to switch between fuel-rich operation and fuel-lean operation at every predetermined time period during the warm-up of the three-way catalytic device.

SUMMARY OF THE INVENTION

Accordingly, it is an object of the present invention to provide an air-fuel ratio control apparatus for an internal combustion engine capable of warming up an emission-controlling catalytic device by supplying unburned fuel and unburned oxygen to the emission-controlling catalytic device without performing fuel-rich operation in one cylinder while performing fuel-lean operation in another cylinder during the warm-up of the emission-controlling catalytic device and without forcibly switching between fuel-rich operation and fuel-lean operation at predetermined time intervals during the warm-up of the emission-controlling catalytic device.

The present invention is directed to an air-fuel ratio control apparatus for an internal combustion engine, including a fuel injection device for supplying fuel into a combustion chamber of the internal combustion engine, an emission-controlling catalytic device provided in an exhaust passage of the internal combustion engine, a catalytic activation determination device for determining whether the emission-controlling catalytic device is active, and a control device for, before the emission-controlling catalytic device is active, controlling fuel injection performed by the fuel injection device to maintain a fuel-lean ratio and to increase an amount of fuel injected during an open intake valve period during which an intake valve of the internal combustion engine is open.

In this air-fuel ratio control apparatus, before the emission-controlling catalytic device is active, the control device may control fuel injection so that a fuel-lean air-fuel ratio is maintained, and may control fuel injection so that an amount of fuel injected during the open intake valve period is greater than an amount of fuel injected during an open intake valve period after the emission-controlling catalytic device is active.

Furthermore, before the emission-controlling catalytic device is active, the control device may control fuel injection so that a fuel injection end timing is delayed in comparison with a fuel injection end timing set after activation of the catalytic device. Therefore the quantity of unburned fuel is increased.

According to the invention, the air-fuel ratio control apparatus for an internal combustion engine supplies the emission-controlling catalytic device with unburned oxygen left over after combustion by maintaining a fuel-lean air-fuel ratio before the emission-controlling catalytic device is active. Furthermore, by increasing the amount of fuel injected during the open intake valve period to an amount greater than an amount of fuel injected during an open intake valve period after the emission-controlling catalytic device is active, the apparatus increases an amount of fuel that is not well mixed with intake air in the intake port, so that unburned fuel remains after combustion. Therefore, unburned fuel is supplied to the emission-controlling catalytic device. As a result, unburned fuel and unburned oxygen supplied to the emission-controlling catalytic device react to generate heat, so that the emission-controlling catalytic device can be quickly warmed up.

The air-fuel ratio control may further have a construction as follows. That is, the catalytic activation determination device includes a catalyst temperature detection device for detecting a temperature of the emission-controlling catalytic device. Before the emission-controlling catalytic device is active, that is, before the temperature of the emission-controlling catalytic device increases to an activation temperature, the control device controls fuel injection so that the amount of fuel injected during the open intake valve period increases.

The air-fuel ratio control apparatus may further have an air-fuel ratio detection device for detecting an air-fuel ratio of combustion gas in the internal combustion engine. In this construction, before the emission-controlling catalytic device is active, the control device controls fuel injection so that the air-fuel ratio detected by the air-fuel ratio detection device becomes a fuel-lean air-fuel ratio.

Furthermore, the air-fuel ratio control apparatus for an internal combustion engine may further include an intake valve, an exhaust valve, and a variable valve timing device capable of varying a valve overlap period during which both the intake valve and the exhaust valve are open. In this construction, before the emission-controlling catalytic device is active, the control device controls the valve overlap period so that an amount of unburned fuel entering the exhaust passage increases.

In the air-fuel ratio control apparatus described immediately above, before the emission-controlling catalytic device is active, the control device may perform control such that a fuel-lean air-fuel ratio is maintained and therefore unburned oxygen increases in quantity, and may control the variable valve timing device so that the amount of unburned fuel entering the exhaust passage becomes greater than an amount of unburned fuel entering the exhaust passage after the emission-controlling catalytic device is active.

Furthermore, in this air-fuel ratio control apparatus, the control device may increase the amount of unburned fuel entering the exhaust passage by increasing the valve overlap period variable by the variable valve timing device.

Therefore, the air-fuel ratio control apparatus supplies the emission-controlling catalytic device with unburned oxygen that remains after combustion, by maintaining a lean air-fuel ratio control apparatus before the emission-controlling catalytic device is active. Furthermore, by setting the valve overlap period longer before activation of the catalytic device than after the activation of the catalytic device, the apparatus increases the amount of fuel that flows from the combustion chamber to the exhaust passage without being burned, so that unburned fuel is supplied to the emission-controlling catalytic device. As a result, unburned fuel and unburned oxygen supplied to the emission-controlling catalytic device react to generate heat, so that the emission-controlling catalytic device can be quickly warmed up.

In the air-fuel ratio control apparatus for an internal combustion engine of the invention, the fuel injection device may inject fuel directly into a cylinder of the engine. Furthermore, the fuel injection device may inject fuel into an intake port of the engine.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
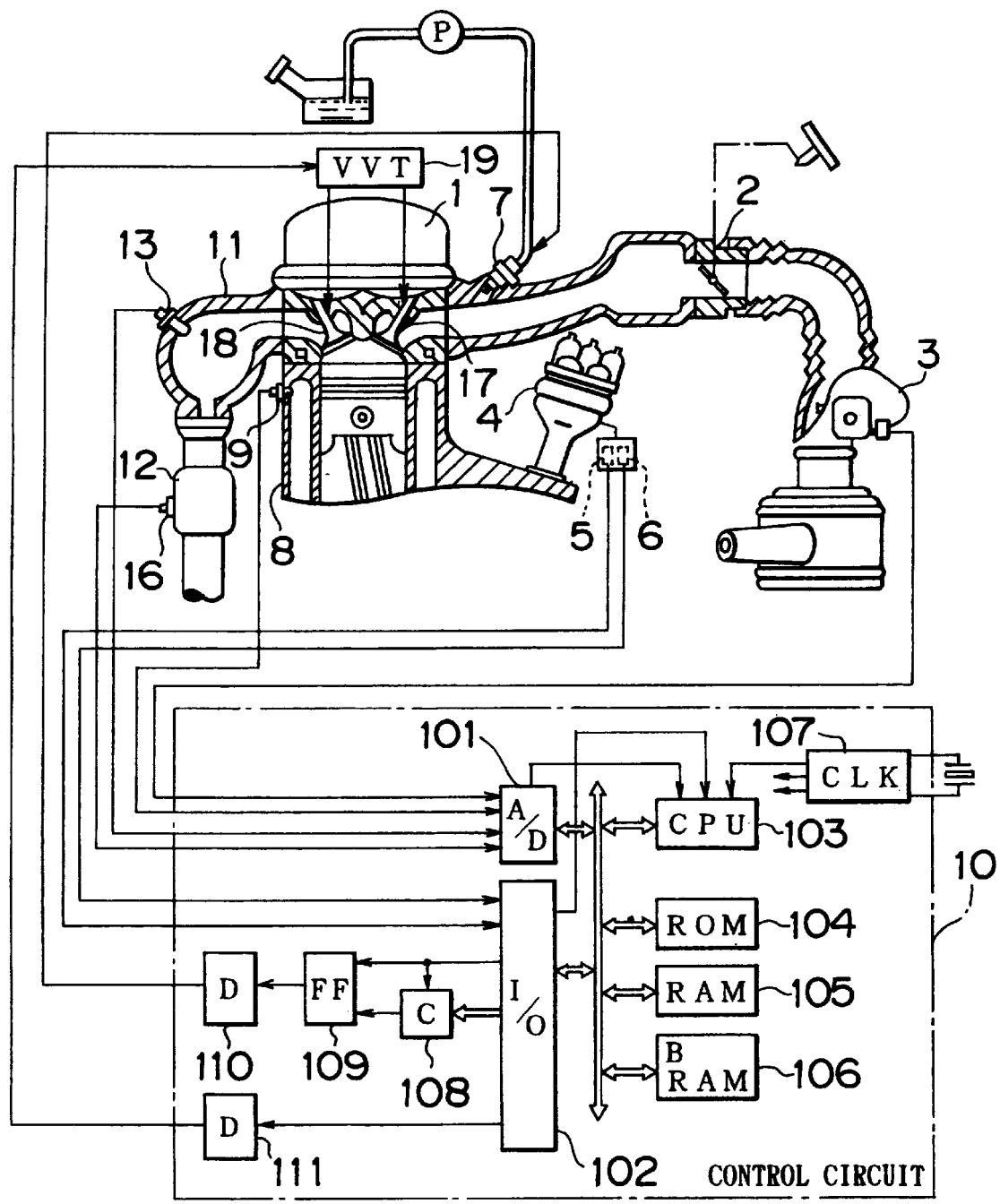
FIG. 1 is a schematic illustration of the overall construction of a first embodiment of the air-fuel ratio control apparatus for an internal combustion engine of the invention.

FIG. 1 is a schematic illustration of the overall construction of a first embodiment of the air-fuel ratio control apparatus for an internal combustion engine of the invention. Referring to FIG. 1, an intake passage 2 of an engine 1 is provided with an air flow meter 3. The air flow meter 3, which directly measures intake air flow quantity, contains a potentiometer and outputs an analog voltage output signal proportional to the measured intake air flow. The output signal from the air flow meter 3 is supplied to an A/D converter 101 with a built-in multiplexer that is provided in a control circuit 10. A distributor 4 is provided with a crank angle sensor 5 that generates a reference position detecting pulse signal at every rotational angle of the sensor shaft corresponding to, for example, 720° in terms of crank angle, and another crank angle sensor 6 that generates a reference position detecting pulse signal at every rotational angle of the sensor shaft corresponding to, for example, 30° in terms of crank angle. The pulse signals from the crank angle sensors 5, 6 are supplied to an input/output interface 102 provided in the control circuit 10. Via the input/output interface 102, the output from the crank angle sensor 6 is supplied to an interrupt terminal of a CPU 103.

The intake passage 2 is provided with fuel injection valves 7 in one-to-one correspondence to the cylinders for supplying pressurized fuel from a fuel supply system to the intake ports of the respective cylinders. A water jacket 8 of a cylinder block of the engine 1 is provided with a water temperature sensor 9 for detecting the temperature of cooling water. The water temperature sensor 9 generates an analog voltage electric signal in accordance with the detected cooling water temperature THW. The output of the water temperature sensor 9 is also supplied to the A/D converter 101.

An exhaust system downstream of an exhaust manifold 11 is provided with a catalytic converter 12 carrying a three-way catalytic device for simultaneously reducing three harmful components of exhaust gas, that is, hydrocarbons (HC), carbon monoxide (CO), and nitrogen oxides (NOx). An $O_2$-sensor 13 is provided in the exhaust manifold 11, that is, upstream of the catalytic converter 12. The $O_2$-sensor 13 generates an electric signal in accordance with the oxygen concentration in exhaust gas. That is, in accordance with whether the air-fuel ratio is at a lean side or a rich side with respect to the theoretical air-fuel ratio, the $O_2$-sensor 13 supplies different output voltages to the A/D converter 101 of the control circuit 10. A temperature sensor 16 is disposed in the catalytic converter 12. In accordance with the temperature of the catalytic device of the catalytic converter 12, the temperature sensor 16 supplies different output voltages to the A/D converter 101 of the control circuit 10.

The control circuit 10 is formed as, for example, a microcomputer. The control circuit 10 includes the A/D converter 101, the input/output interface 102, the CPU 103, a ROM 104, a RAM 105, a backup RAM 106, a clock generator circuit 107, and the like.

The control circuit 10 further includes a down counter 108, a flip-flop 109, and a drive circuit 110 that are provided for controlling the fuel injection valves 7. When a fuel injection amount TAU is calculated in the control circuit 10, the fuel injection amount TAU is pre-set in the down counter 108, and the flip-flop 109 is also set. In response, the drive circuit 110 starts to energize a fuel injection valve 7. The down counter 108 counts clock signals (not indicated). When a carry-out terminal of the down counter 108 reaches a "1"-level, the flip-flop 109 is set so that the drive circuit 110 stops energizing the fuel injection valve 7. That is, the fuel injection valve 7 is energized corresponding to the fuel injection amount TAU, so that an amount of fuel equal to the fuel injection amount TAU is injected into the corresponding combustion chamber of the engine 1.

A variable valve timing device 19 for varying the valve timing of each intake valve 17 and each exhaust valve 18 is connected to a drive circuit 111. By varying the valve timing of the intake valve 17 and the exhaust valve 18, the variable valve timing device 19 varies a valve overlap period during which both the intake valve 17 and the exhaust valve 18 are open.

An interruption to the CPU 103 occurs, for example, when A/D conversion by the A/D converter 101 is completed, or when the input/output interface 102 receives the pulse signal from the crank angle sensor 6 by the input/output interface 102 or receives an interruption signal from the clock generator circuit 107, etc. Intake air flow data Q from the air flow meter 3 and cooling water temperature data THW from the water temperature sensor 9 are taken in during an A/D conversion routine executed at every predetermined time period, so that the data is stored into the RAM 105. That is, the data Q and THW is updated in the RAM 105 at every predetermined time period. Engine revolution speed data Ne is calculated by an interruption caused by the crank angle sensor 6 at every 30° CA (crank angle). The calculated revolution speed data Ne is stored into a predetermined area of the RAM 105.

Figure 2:
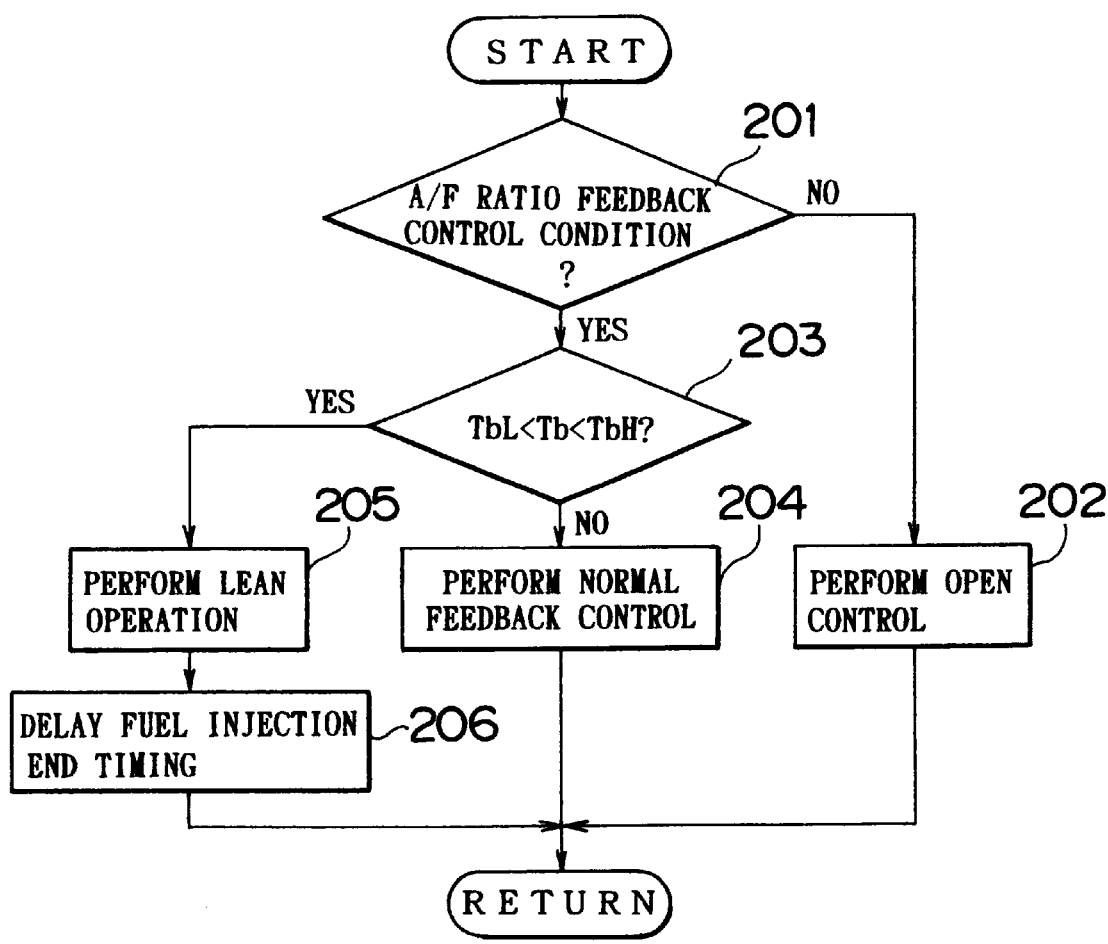
FIG. 2 is a flowchart illustrating an air-fuel ratio control method according to the first embodiment.

An air-fuel ratio control method employed by the internal combustion engine air-fuel ratio control apparatus of this embodiment will now be described. FIG. 2 is a flowchart illustrating the air-fuel ratio control method according to this embodiment. The internal combustion engine air-fuel ratio control apparatus performs the air-fuel ratio control illustrated in FIG. 2 in a predetermined cycle. After starting the air-fuel ratio control, the air-fuel ratio control apparatus determines in step 201 whether an air-fuel ratio control feedback control condition is established, that is, whether to determine a fuel injection amount TAU based on the value of output of the $O_2$-sensor. If the determination is negative, operation proceeds to step 202, where open control is performed. That is, in step 202, a fuel injection amount TAU is calculated, not on the basis of the value of output of the $O_2$-sensor, but on the basis of an intake air flow Q, an engine revolution speed Ne, and a predetermined air-fuel ratio correction factor FAF that is pre-stored in the RAM, and then an amount of fuel corresponding to the calculated fuel injection amount TAU is actually injected. Subsequently, this routine ends. Conversely, if the determination in step 201 is affirmative, operation proceeds to step 203.

In step 203, the air-fuel ratio control apparatus determines whether the catalyst temperature Tb of the catalytic converter is an appropriate temperature to execute the processing of step 205 described later, that is, whether the catalyst temperature Tb is an appropriate temperature to warm up the catalytic converter by supplying unburned fuel and unburned oxygen to the catalytic converter for the reaction therebetween. If the catalyst temperature Tb is equal to or lower than a predetermined threshold TbL and, therefore, unburned fuel and unburned oxygen will not properly react at the catalytic converter, operation proceeds to step 204. If the catalyst temperature Tb is equal to or higher than a predetermined threshold TbH, that is, if the catalyst temperature Tb has reached the activation temperature TbH, operation also proceeds to step 204 even though there is no need to warm up the catalytic converter. However, if the catalyst temperature Tb is in a range of TbL<Tb<TbH and, therefore, the catalytic converter needs to be warmed up, operation proceeds to step 205.

In step 204, which follows the negative determination in step 203, the air-fuel ratio control apparatus performs normal feedback control, that is, calculates a fuel injection amount TAU such that the value of $O_2$-sensor output will indicate the theoretical air-fuel ratio, and injects an amount of fuel equal to the fuel injection amount TAU. Subsequently, this routine ends. In step 204, the air-fuel ratio control apparatus sets a fuel injection end timing such that the amount of fuel injected properly burns. That is, the apparatus ends the fuel injection before the intake valve starts to open, so that the amount of fuel injected and the amount of intake air thoroughly mix in the intake port.

In step 205, which follows the affirmative determination in step 203, the internal combustion engine air-fuel ratio control apparatus performs fuel-lean operation, that is, calculates a fuel injection amount TAU such that the value of $O_2$-sensor output will indicate a lean air-fuel ratio instead of the theoretical air-fuel ratio. By performing fuel-lean operation, an amount of oxygen remains after combustion in the combustion chamber, so that unburned oxygen can be supplied to the catalytic converter. Subsequently in step 206, the fuel injection end timing is delayed in comparison with that set in step 204, so that the fuel injection ends during the open intake valve period. Subsequently, this routine ends. Due to the processing in step 206, the fuel injection continues into the open intake valve period, so that a not-well-mixed mixture of fuel and intake air is supplied into the combustion chamber. As a result, an amount of fuel remains unburned after combustion in the combustion chamber, so that unburned fuel can be supplied to the catalytic converter. Unburned fuel and unburned oxygen supplied to the catalytic converter react to generate heat, thereby warming up the catalytic converter.

Figure 3:
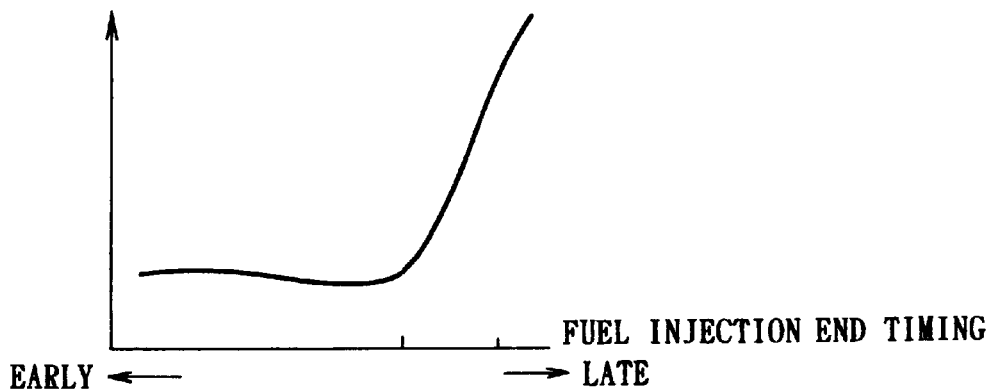
FIG. 3 is a graph indicating a relationship between the fuel injection end timing and the quantity of unburned oxygen according to the first embodiment.

FIG. 3 is a graph indicating a relationship between the fuel injection end timing and the quantity of unburned oxygen according to this embodiment. As indicated in FIG. 3, the quantity of unburned oxygen occurring where the fuel injection end timing is delayed, that is, where the fuel injection is ended during the open intake valve period, is greater than the quantity of unburned oxygen occurring where the normal feedback control is performed, that is, where the fuel injection is ended before the open intake valve period.

Figure 4:
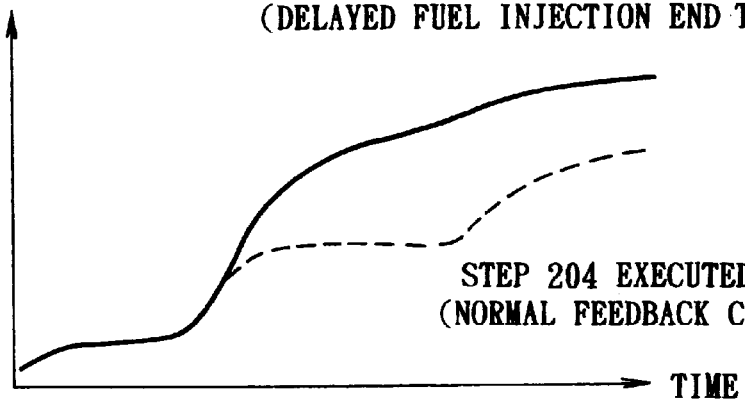
FIG. 4 is a graph indicating the effect of the warm-up operation according to the first embodiment.

FIG. 4 is a graph indicating the effect of the warm-up operation according to this embodiment. As indicated in FIG. 4, the catalyst temperature rises more quickly where steps 205, 206 are executed, that is, where good amounts of unburned fuel and oxygen are supplied to the catalytic converter, than where the processing in step 204 substantially the same as the normal feedback control is executed, that is, where good amounts of unburned fuel and oxygen are not supplied to the catalytic converter.

As described above, this embodiment ends fuel injection before the intake valve starts to open in step 204, and ends fuel injection while the intake valve is open in step 206. However, this setting of fuel injection end timing is merely illustrative. Various modifications to the setting of fuel injection end timing and other features of the first embodiment are possible while achieving substantially the same advantages as stated above, as long as the amount of fuel injected during the open intake valve period is greater before activation of the catalytic device than after activation of the catalytic device. Furthermore, in an internal combustion engine equipped with a fuel injection valve having a constant injecting rate (that is, the amount of fuel injected per unit time is constant), substantially the same advantages as stated above can be achieved if the fuel injection duration within the open intake valve period is longer before activation of the catalytic device than after the activation of the catalytic device.

Figure 5:
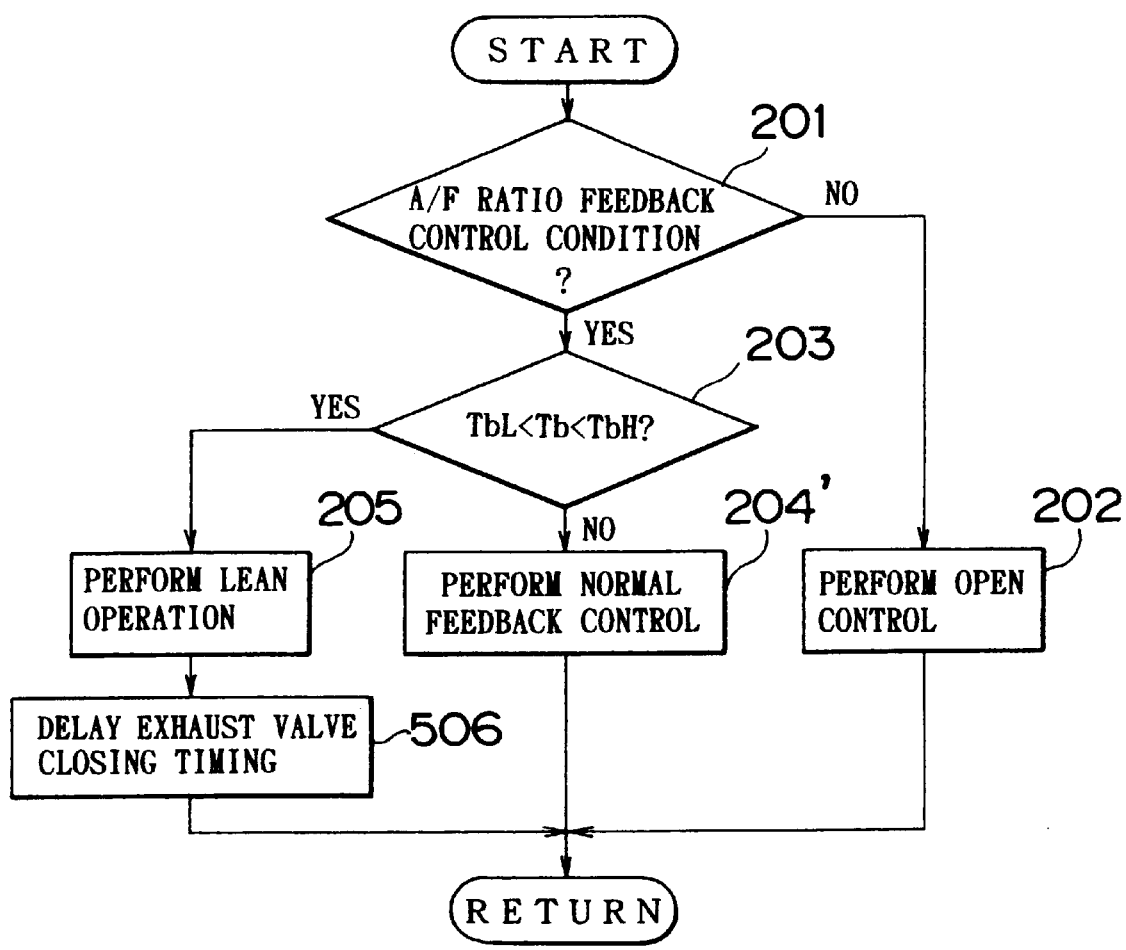
FIG. 5 is a flowchart illustrating an air-fuel ratio control method according to a second embodiment of the invention.

A second embodiment of the air-fuel ratio control apparatus for an internal combustion engine of the invention will be described below. The construction of this embodiment is substantially the same as that of the first embodiment shown in FIG. 1. FIG. 5 is a flowchart illustrating an air-fu ratio control method employed by the air-fuel ratio control apparatus of the second embodiment. Steps in FIG. 5 the same as those in FIG. 2 are represented by the same reference numerals, and will not be described again. Briefly, the air-fuel ratio control method according to the second embodiment differs from the method according to the first embodiment in steps 204' and 506.

In step 204', the internal combustion engine air-fuel ratio control apparatus of the second embodiment performs normal feedback control as in the first embodiment. That is, the apparatus calculates a fuel injection amount TAU such that the value of $O_2$-sensor output will indicate the theoretical air-fuel ratio, and then injects an amount of fuel equal to the calculated fuel injection amount TAU. Subsequently, this routine ends. In step 204', a valve overlap period during which both the intake valve and the exhaust valve are open is set such that the amount of fuel injected properly burns. That is, a valve overlap period is set such that injected fuel is not allowed to escape combustion arid flow into the exhaust passage.

In step 506, which follows step 205, the air-fuel ratio control apparatus delays the closing timing of the exhaust valve to increase the valve overlap period so that a partial amount of injected fuel will flow into the exhaust passage without being burned. Subsequently, the routine ends. Due to the processing in step 506, an amount of fuel flows through the combustion chamber into the exhaust passage without being burned in the combustion chamber, so that unburned fuel can be supplied to the catalytic converter. Unburned fuel supplied to the catalytic converter reacts with unburned oxygen supplied thereto by the processing in step 205, generating heat. Therefore, the catalytic converter can be warmed up.

Figure 6:
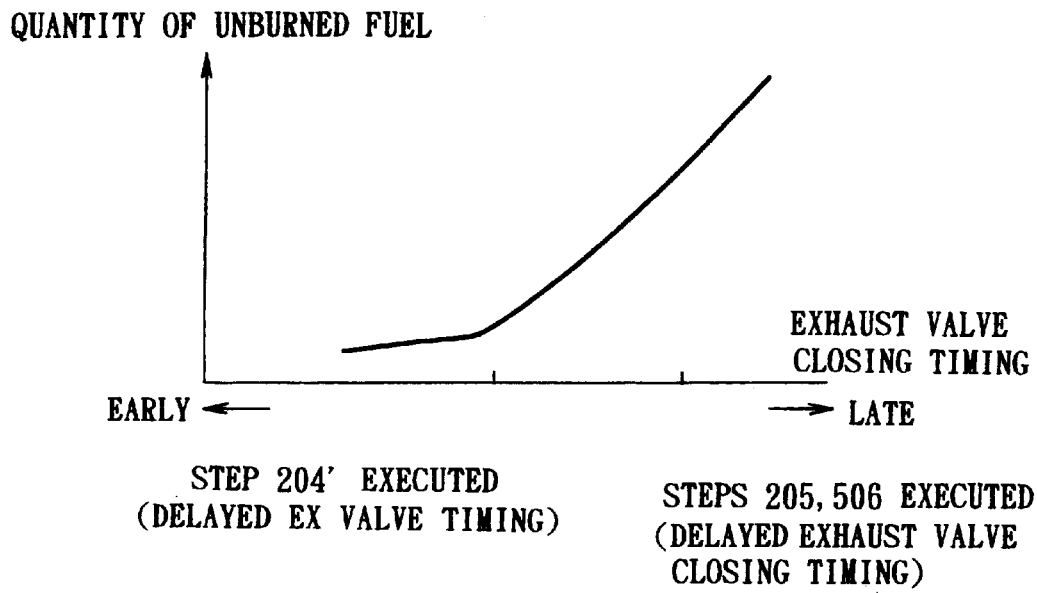
FIG. 6 is a graph indicating a relationship between the exhaust valve closing timing and the quantity of unburned fuel according to the second embodiment.

FIG. 6 is a graph indicating a relationship between the exhaust valve closing timing and the quantity of unburned fuel according to the second embodiment. As indicated in FIG. 6, the quantity of unburned fuel flowing into the exhaust passage is greater where the exhaust valve closing timing is delayed than where the normal feedback control is performed, that is, where a normal valve overlap period is set.

Figure 7:
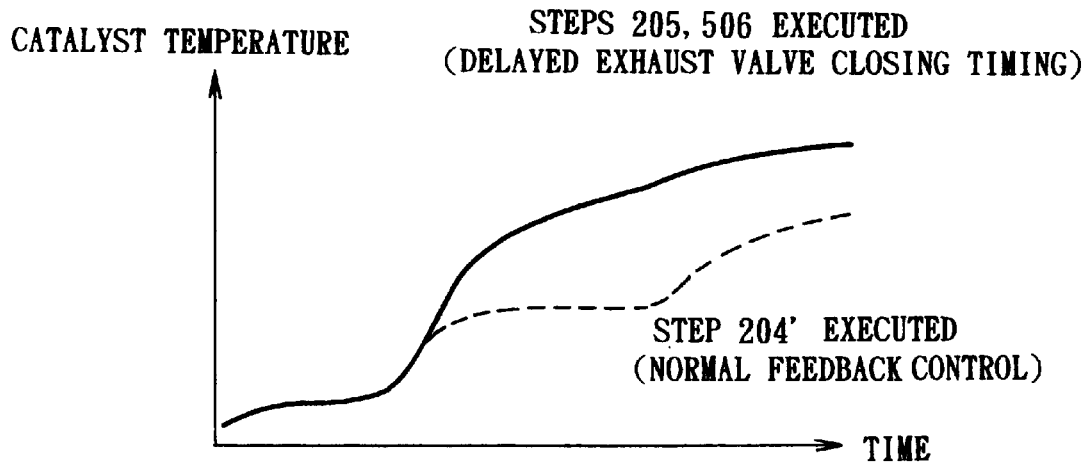
FIG. 7 is a graph indicating the effect of the warm-up operation according to the second embodiment.

FIG. 7 is a graph indicating the effect of the warm-up operation according to this embodiment. As indicated in FIG. 7, the catalyst temperature rises more quickly where steps 205, 506 are executed, that is, where good amounts of unburned fuel and oxygen are supplied to the catalytic converter, than where the processing in step 204 substantially the same as the normal feedback control is executed, that is, where good amounts of unburned fuel and oxygen are not supplied to the catalytic converter.

Although in the second embodiment, the fuel injection valve 7 supplies fuel into the intake port, it is also possible to provide a fuel injection valve for injecting fuel directly into the cylinder instead of the fuel injection valve 7 as a modification to this embodiment. This modification also achieves substantially the same advantages as stated above.

Figure 8:
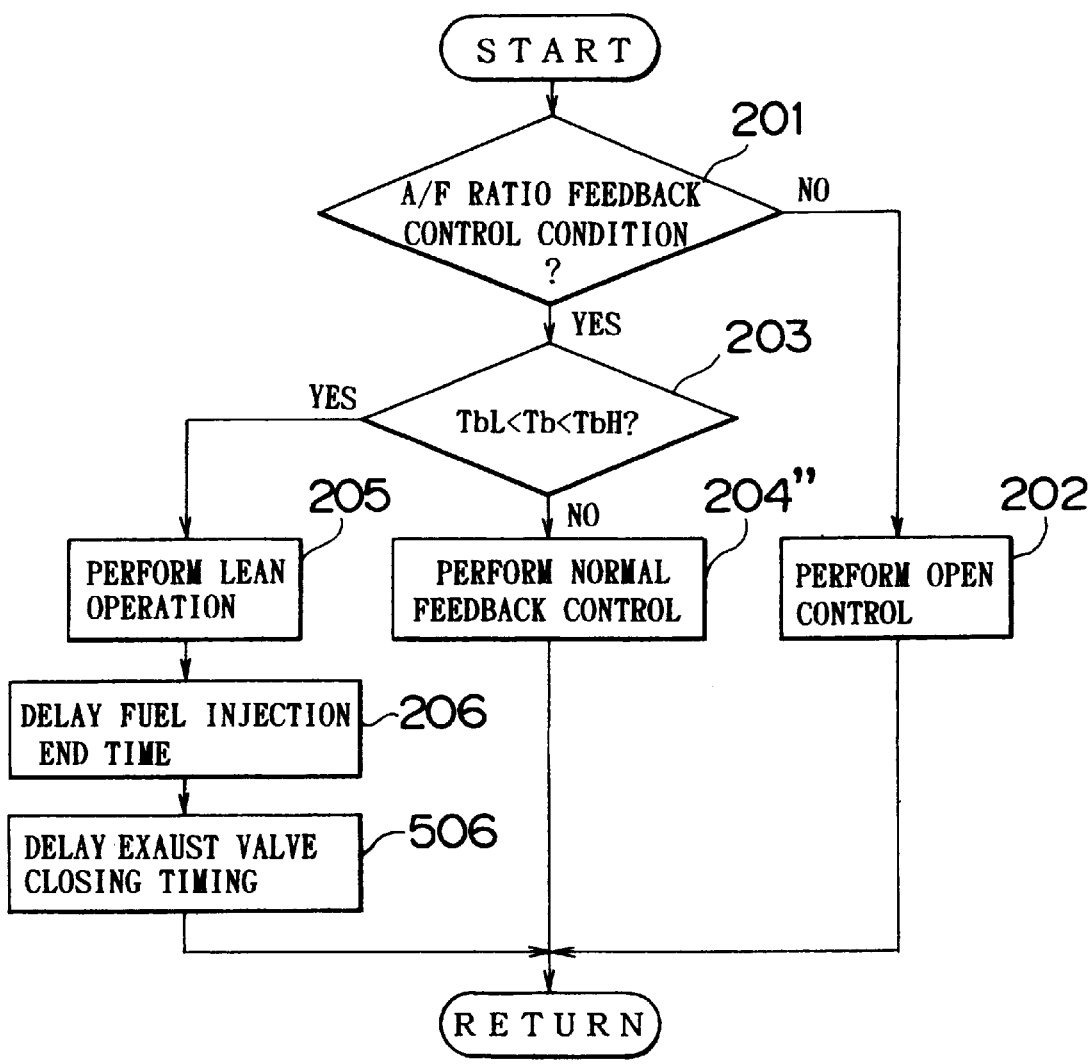
FIG. 8 is a flowchart illustrating an air-fuel ratio control method according to a third embodiment of the invention.

A third embodiment of the air-fuel ratio control apparatus for an internal combustion engine of the invention will be described below. The construction of this embodiment is substantially the same as that of the first embodiment shown in FIG. 1. FIG. 8 is a flowchart illustrating an air-fuel ratio control method employed by the air-fuel ratio control apparatus of the third embodiment. Steps in FIG. 8 the same as those in FIG. 2 are represented by the same reference numerals, and will not be described again. Briefly, the air-fuel ratio control method according to the third embodiment differs from the method according to the first embodiment in that step 204 is replaced by steps 204" and that step 506 substantially the same as that in the second embodiment follows step 206.

In step 204", the internal combustion engine air-fuel ratio control apparatus of the second embodiment performs normal feedback control as in the first embodiment. That is, the apparatus calculates a fuel injection amount TAU such that the value of $O_2$-sensor output will indicate the theoretical air-fuel ratio, and then injects an amount of fuel equal to the calculated fuel injection amount TAU. Subsequently, this routine ends. In step 204", the fuel injection end timing and the valve overlap period are set so that the amount of fuel injected properly burns. That is, the fuel injection end timing is set to end the fuel injection before the intake valve opens, so that the amount of fuel injected and the amount of intake air thoroughly mix in the intake port. The valve overlap period is set so that fuel injected or air-fuel mixture is not allowed to escape combustion and flow into the exhaust passage without being burned.

In step 206, the air-fuel ratio control apparatus delays the fuel injection end timing in comparison with that set in step 204" so that the fuel injection ends during the open intake valve period. Due to the processing in step 206, fuel injected during the open intake valve period is supplied into the combustion chamber without thoroughly mixing with intake air. Subsequently in step 506, the exhaust valve closing timing is delayed in comparison with that set in step 204" so that a partial amount of fuel injected will flow into the exhaust passage without being burned. Subsequently, this routine ends. Due to the processing in step 206, an amount of fuel remains unburned after combustion in the combustion chamber, so that unburned fuel can be supplied to the catalytic converter. Due to the processing in step 506, an amount of fuel flows through the combustion chamber into the exhaust passage without being burned in the combustion chamber, so that unburned fuel can be supplied to the catalytic converter. Unburned fuel thus supplied to the catalytic converter reacts with unburned oxygen supplied thereto by the processing in step 205, generating heat to warm up the catalytic converter. This embodiment is able to supply greater amounts of unburned fuel to the catalytic converter than the first and second embodiments, so that the three-way catalytic device can be more quickly warmed up.

As described above, the third embodiment ends fuel injection before the intake valve starts to open in step 204", and ends fuel injection while the intake valve is open in step 206. However, this setting of the fuel injection end timing is merely illustrative, and does not limit the invention. Various modifications to the setting of fuel injection end timing and other features of this embodiment are possible while achieving substantially the same advantages as stated above, as long as the amount of fuel injected during the open intake valve period is greater before activation of the catalyst than after activation of the catalyst. Furthermore, in an internal combustion engine equipped with a fuel injection valve having a constant injecting rate (that is, the amount of fuel injected per unit time is constant), substantially the same advantages as stated above can be achieved if the fuel injection duration within the open intake valve period is longer before activation of the catalytic device than after activation of the catalytic device.

Although in the third embodiment, the fuel injection valve 7 supplies fuel into the intake port, it is also possible to provide a fuel injection valve for injecting fuel directly into the cylinder instead of the fuel injection valve 7 as a modification to this embodiment.

Although the foregoing embodiments employs an $O_2$-sensor for detecting air-fuel ratio, it is also possible to employ any other known air-fuel ratio detecting device, such as an air-fuel ratio sensor or the like.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements included within the spirit and scope of the invention.

What is claimed is:

1. An air-fuel ratio control apparatus for an internal combustion engine, comprising:
   fuel injection means for supplying fuel to a combustion chamber of the internal combustion engine;
   an emission-controlling catalytic device provided in an exhaust passage of the internal combustion engine;
   catalytic activation determination means for determining whether the emission-controlling catalytic device is active; and
   control means for, before the emission-controlling catalytic device is active, controlling fuel injection by the fuel injection means to maintain a fuel-lean ratio while increasing an amount of fuel injected during an open intake valve period during which an intake valve of the internal combustion engine is open.

2. An air-fuel ratio control apparatus according to claim 1, wherein, before the emission-controlling catalytic device is active, the control means controls fuel injection to maintain a fuel-lean air-fuel ratio, and controls fuel injection so that a first amount of fuel is injected during the open intake valve period, wherein the first amount of fuel is greater than a second amount of fuel injected during an open intake valve period after the emission-controlling catalytic device is active.

3. An air-fuel ratio control apparatus, according to claim 1, wherein, before the emission-controlling catalytic device is active, the control means delays a fuel injection end timing as compared to a fuel injection end timing set after activation of the catalytic device.

4. An air-fuel ratio control apparatus, according to claim 1,
   wherein the catalytic activation determination means includes catalyst temperature detection means for detecting a temperature of the emission-controlling catalytic device, and
   wherein, before the temperature of the emission-controlling catalytic device increases to an activation temperature thereof, the control means controls fuel injection so that the amount of fuel injected during the open intake valve period increases.

5. An air-fuel ratio control apparatus according to claim 4, wherein, before the emission-controlling catalytic device is active, the control means delays a fuel injection end timing as compared to a fuel injection end timing set after activation of the catalytic device.

6. An air-fuel ratio control apparatus according to claim 1, wherein the emission-controlling catalytic device is a three-way catalytic device that reduces amounts of HC, CO and $NO_x$ components of exhaust gas from the internal combustion engine.

7. An air-fuel ratio control apparatus according to claim 1, further comprising air-fuel ratio detection means for detecting an air-fuel ratio of combustion gas in the internal combustion engine,
   wherein, before the emission-controlling catalytic device is active, the control means controls fuel injection so that the air-fuel ratio detected by the air-fuel ratio detection means becomes a fuel-lean air-fuel ratio.

8. An air-fuel ratio control apparatus according to claim 7, wherein the air-fuel ratio detection means includes an $O_2$-sensor.

9. An air-fuel ratio control apparatus according to claim 7, wherein, after the emission-controlling catalytic device is active, the control means controls fuel injection so that the air-fuel ratio detected by the air-fuel ratio detection means becomes a theoretical air-fuel ratio.

10. An air-fuel ratio control apparatus according to claim 1, wherein, before the emission-controlling catalytic device is active, the control means controls fuel injection to increase an amount of unburned fuel entering the exhaust passage.

11. An air-fuel ratio control apparatus according to claim 1, further comprising:
    an intake valve;
    an exhaust valve; and
    a variable valve timing device for varying a valve overlap period during which both the intake valve and the exhaust valve are open,
    wherein, before the emission-controlling catalytic device is active, the control means controls the variable valve timing device to adjust the valve overlap period to increase an amount of unburned fuel entering the exhaust passage.

12. An air-fuel ratio control apparatus according to claim 11, wherein, before the emission-controlling catalytic device is active, the control means maintains a fuel-lean air-fuel ratio to increase a quantity of oxygen present in the exhaust gas, and controls the variable valve timing device so that an amount of unburned fuel entering the exhaust passage becomes greater than an amount of unburned fuel entering the exhaust passage after the emission-controlling catalytic device is active.

13. An air-fuel ratio control apparatus according to claim 12, wherein the control means increases the amount of unburned fuel entering the exhaust passage by increasing the valve overlap period variable by the variable valve timing device.

14. An air-fuel ratio control apparatus according to claim 11, wherein the catalytic activation determination means includes catalyst temperature detection means for detecting a temperature of the emission-controlling catalytic device, and wherein, before the temperature of the emission-controlling catalytic device increases to an activation temperature thereof, the control means maintains a fuel-lean air-fuel ratio to increase a quantity of oxygen present in the exhaust gas, and controls the variable valve timing device so that the valve overlap period becomes longer than a valve overlap period occurring after the emission-controlling catalytic device is active to increase an amount of unburned fuel entering the exhaust passage.

15. An air-fuel ratio control apparatus according to claim 14, wherein, before activation of the catalytic device, the control means controls the variable valve timing device so that a closing timing of the exhaust valve is delayed in comparison with a closing timing of the exhaust valve set after activation of the catalytic device.

16. An air-fuel ratio control apparatus according to claim 1, wherein the fuel injection means injects fuel directly into a cylinder of the internal combustion engine.

17. An air-fuel ratio control apparatus according to claim 1, wherein the fuel injection means injects fuel into an intake port of the internal combustion engine.

18. An air-fuel ratio control apparatus according to claim 17, wherein the fuel injection means injects fuel at a constant injecting rate, and wherein, when the emission-controlling catalytic device is not yet activated, the control means increases a period during which fuel is injected within the open intake valve period as compared to a period during which fuel is injected within the open intake valve period after the emission-controlling catalytic device is active, to increase a quantity of unburned fuel present in the exhaust gas.

19. An air-fuel ratio control apparatus for an internal combustion engine, comprising:

an intake valve;

an exhaust valve;

a variable valve timing device for varying a valve overlap period during which both the intake valve and the exhaust valve are open;

fuel injection means for supplying fuel into a combustion chamber of the internal combustion engine;

an emission-controlling catalytic device provided in an exhaust passage of the internal combustion engine;

catalytic activation determination means for determining whether the emission-controlling catalytic device is active; and control means for, before the emission-controlling catalytic device is active, controlling fuel injection to maintain a fuel-lean ratio while increasing an amount of unburned fuel in the exhaust passage by increasing a duration of the valve overlap period via the variable valve timing device.

* * * * *

UNITED STATES PATENT AND TRADEMARK OFFICE
CERTIFICATE OF CORRECTION

PATENT NO. : 6,134,884
DATED : 24 October 2000
INVENTOR(S) : Noriyoshi MORINAGA

It is certified that error appears in the above-identified patent and that said Letters Patent is hereby corrected as shown below:

In the Abstract: Line 9: Change "Longer" to --longer--.

| Column | Line | |
|--------|------|---|
| 7 | 23 | Change "air-fu" to --air-fuel--. |
| 7 | 42 | Change "arid" to --and--. |

Signed and Sealed this

Fifteenth Day of May, 2001

Attest:

NICHOLAS P. GODICI

Attesting Officer        Acting Director of the United States Patent and Trademark Office